United States Patent [19]

Dan

[11] 4,398,781
[45] Aug. 16, 1983

[54] SEALING ASSEMBLY FOR A GEOPHYSICAL CABLE CONNECTOR

[75] Inventor: Petre F. Dan, Houston, Tex.

[73] Assignee: AMF Incorporated, White Plains, N.Y.

[21] Appl. No.: 310,202

[22] Filed: Oct. 9, 1981

[51] Int. Cl.³ .............................................. H01R 4/00
[52] U.S. Cl. ............................ 339/94 M; 339/116 R
[58] Field of Search .................. 339/94, 49 R, 116 R, 339/116 C; 174/17 CT, 66, 53; 138/26

[56] References Cited

U.S. PATENT DOCUMENTS

| 3,432,612 | 3/1969 | Spiegel et al. | 339/94 M X |
| 3,672,398 | 6/1972 | Ichiryu et al. | 138/26 X |
| 3,684,819 | 8/1972 | Wilson | 174/53 |
| 3,780,773 | 12/1973 | Haugen | 174/66 X |
| 4,265,274 | 5/1981 | Zahid | 138/76 X |

Primary Examiner—Eugene F. Desmond
Attorney, Agent, or Firm—David E. Dougherty; John H. Gallagher

[57] ABSTRACT

A sealing assembly for use in a geophysical cable connector having two interconnecting bodies each having a plurality of coacting electrical connectors and a cover connected to each body by a plurality of screws. A bladder gasket is positioned between each body and each cover with a plurality of openings around the outer periphery for receiving the screws. The gasket includes a sealing ridge extending outwardly from one side of the gasket entirely around the gasket and spaced inside the opening. Each body includes a recess inside of the screws for receiving the sealing ridge. The gasket is enclosed inside of the ridge for sealing the interior of the body from the environment. The sealing ridge may be semi-circular shaped or trapezoidal shaped in cross section.

3 Claims, 5 Drawing Figures

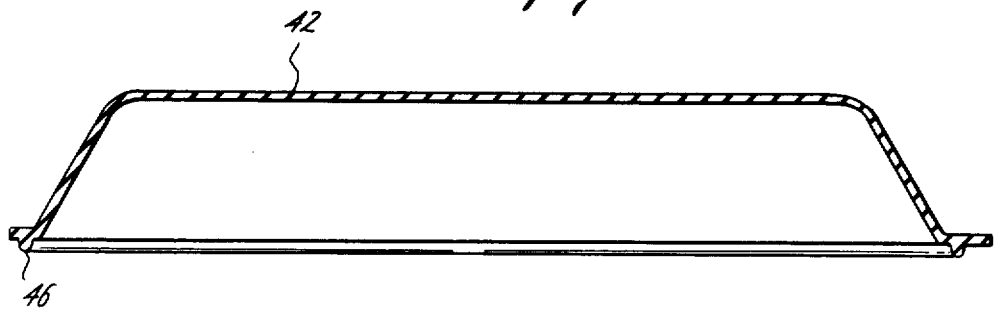
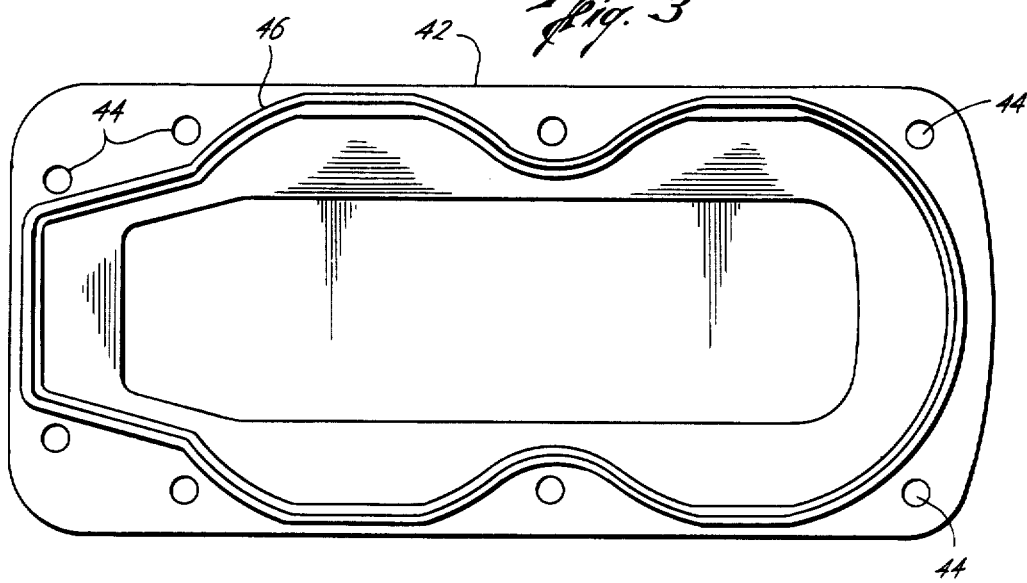
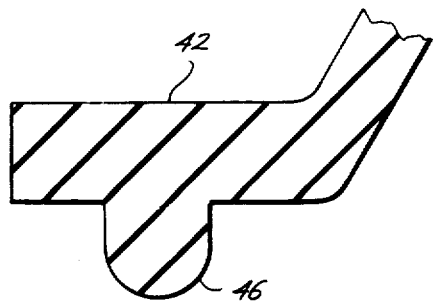
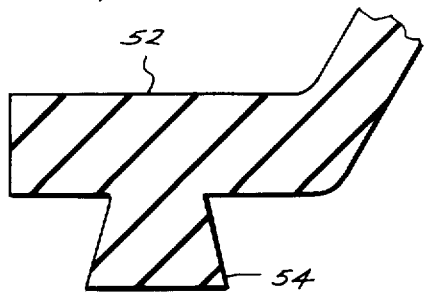

SEALING ASSEMBLY FOR A GEOPHYSICAL CABLE CONNECTOR

BACKGROUND OF THE INVENTION

Geophysical connectors are used in geophysical exploration to releasably connect electrical cables for gathering geophysical data. The connectors interconnect a plurality of electrical contacts and are used in hostile field conditions. The connectors may be subject to temperature ranges from minus 40° C. to a plus 105° C. and may be subjected to high humidity, ice, mud, water and other adverse conditions.

The present invention is directed to a sealing assembly for use in a geophysical cable connector to protect the coacting electrical contacts in the connector from the existing environment.

SUMMARY

The present invention is directed to an improvement of a sealing assembly in geophysical cable connector having two interconnecting bodies each having a plurality of coacting electrical connectors and a cover connected to each body by a plurality of screws. The sealing assembly includes a sealing bladder gasket positioned between each body and cover with the gasket having a plurality of openings around its outer periphery for receiving the screws. The gasket includes a sealing ridge extending outwardly from one side of the gasket entirely around the gasket and spaced inside of the openings. Each body includes a recess inside of the screws for receiving the sealing ridge and the gasket is enclosed inside of the ridge for sealing the interior of the body from the environment.

Another feature of the present invention is wherein the sealing ridge may be suitably shaped such as being semi-circular shaped in cross section or trapezoidally shaped in cross section.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 2 is an enlarged elevational view, in cross section, of another embodiment of the sealing bladder gasket of the present invention, FIG. 3 is a bottom elevational view of the gasket of FIG. 2, FIG. 4 is an enlarged fragmentary cross-sectional elevational view of the sealing ridge of the gasket shown in FIG. 2, and FIG. 5 is an enlarged fragmentary cross-sectional elevational view of the sealing ridge of the gasket shown in FIG. 1.

DESCRIPTION OF THE PREFERRED EMBODIMENT

Figure 1:
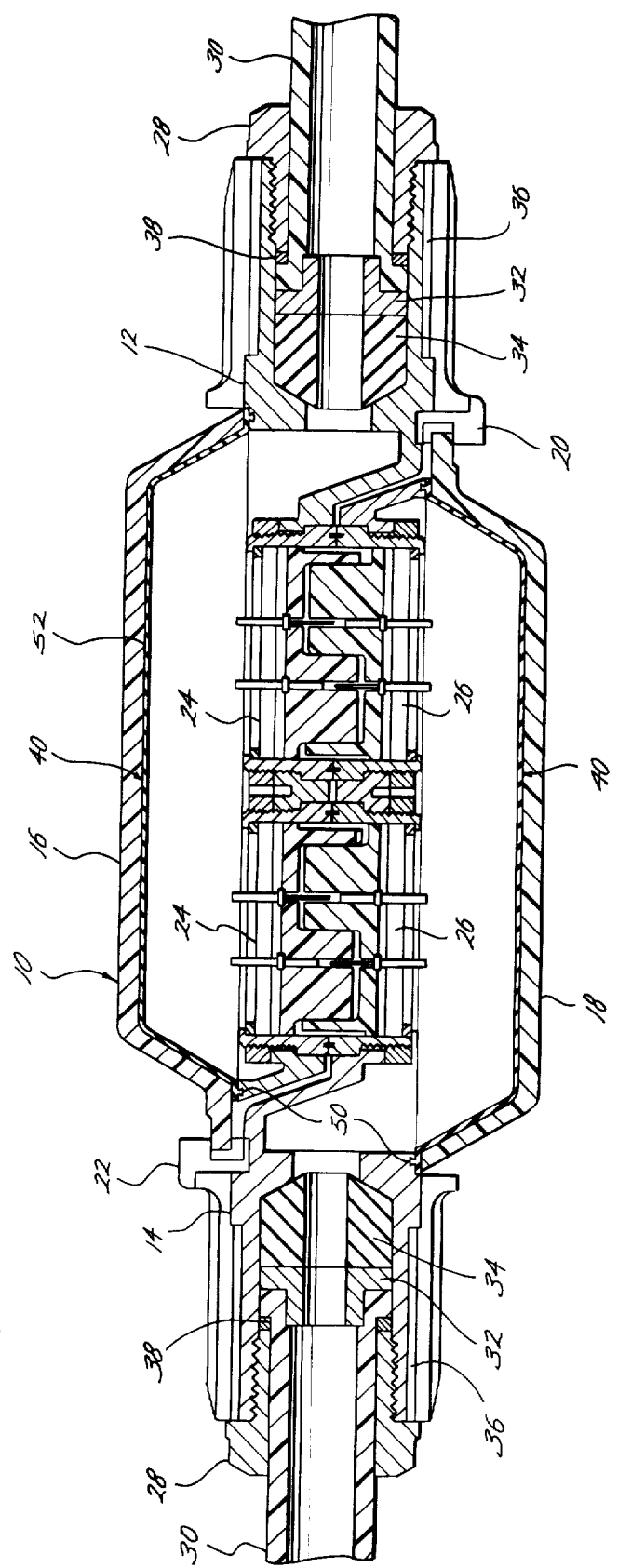
FIG. 1 is an elevational view in cross section, of a geophysical cable connector including the sealing assembly of the present invention.

Referring now to the drawings and particularly to FIG. 1, the reference numeral 10 generally indicates a geophysical land cable connector having a first body 12 and a second body 14 in which the first body includes a cover 16 and the second body 14 includes a cover 18. The covers 16 and 18 are connected to the bodies 12 and 14, respectively, as is conventional by a plurality of screws (not shown). Suitable connecting means such as a cam lock assembly 20 is provided on the body 12 and a cam lock assembly 22 is provided on the body 14 for securing the bodies 12 and 14 together as shown in FIG. 1.

Each of the bodies 12 and 14 includes a plurality of coacting electrical connectors. Thus one or more multi pin connectors 24 may be provided in the body 12 and coacting connectors 26 may be provided in the body 14. When the bodies 12 and 14 are locked together the multi pin connectors 24 coact with the multi pin connectors 26 to make the desired connections. One typical cable connector 10 may include up to 244 electrical contacts. Each body 12 and 14 is adapted to receive an electrical cable (not shown) for connection to the electrical connectors 24 and 26. Thus each of the bodies 12 and 14 may include a water proof connection for receiving a cable such as compression nut 28, a cable strain relief 30, a compression bushing 32, a gromet 34, a bearing 36, and a washer 38.

The above general description of a geophysical connector is known. The present invention is generally directed to providing a sealing assembly generally indicated by the reference numeral 40 between each of the covers 16 and 18 and their respective bodies 12 and 14.

Referring now to FIGS. 2, 3 and 4, one form of the present invention is best seen in which a sealing bladder gasket 42 is provided which includes a plurality of openings 44 around its outer periphery for receiving screws for connecting the covers 16 and 18 to the bodies 12 and 14. The gasket 42 including a sealing ridge 46 extending outwardly from one side of the gasket 40 entirely around the gasket but spaced inside the openings 44. Each body 12 and 14 includes a recess 50 (FIG. 1) inside of the screws for coacting with and receiving the sealing ridge 46. It is to be noted that the gasket 42 encloses the entire inside of the ridge 46 for sealing the interior of the bodies 12 and 14 from the environment.

The gasket 52 shown in FIGS. 1 and 5 is identical to the gasket shown in FIGS. 2-4 with the exception that the sealing ridge is trapezoidally shaped in cross section while the sealing ridge 46 in FIGS. 2-4 is semi-circular shaped in cross section. Other shapes may be utilized if desired.

In use, the bladder gasket 42 or 52 may be secured between the covers 16 and 18 to the bodies 12 and 14 respectively. The ridges 46 and 54 will be positioned in the body recesses 50 to provide a seal therein and are held securely in a sealing relationship by being backed up with the covers 16 and 18. In addition, the bladder gaskets 42 or 52 will completely isolate the interior of the bodies from exposure to the environment through the covers 16 and 18. The gaskets 42 and 52 are preferably made of synthetic rubber and even in the event that moisture seeps under the covers and on the outside of the bladders 42 or 52, the bladders will prevent the moisture from reaching the electrical connectors 24 and 26.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts, will readily suggest themselves to those skilled in the art and which are encompassed within the spirit of the invention and the scope of the appended claims.

What is claimed is:

1. In a geophysical cable connector having two interconnecting bodies each having a plurality of coacting electrical connectors and a cover connected to each body by a plurality of screws, the improvement of a sealing assembly comprising, a sealing bladder gasket positioned between each body and cover, said gasket including a plurality of openings around its outer periphery for receiving said screws, said gasket including a sealing ridge extending outwardly from one side of said gasket entirely around the gasket and spaced inside of said openings, each body including a recess inside of said screws for receiving the sealing ridge, said gasket being enclosed inside of said ridge for sealing the interior of the body from the environment.

2. The apparatus of claim 1 wherein the sealing ridge is semi-circular shaped in cross section.

3. The apparatus of claim 1 wherein the sealing ridge is trapezoidal shaped in cross section.

* * * * *